United States Patent [19]

Jerome

[11] 4,317,131

[45] Feb. 23, 1982

[54] SYSTEM AND METHOD FOR REPRODUCING PICTURES AND RELATED AUDIO INFORMATION

[75] Inventor: Jonathan A. Jerome, Palo Alto, Calif.

[73] Assignee: McDonnell Douglas Corporation, Long Beach, Calif.

[21] Appl. No.: 73,939

[22] Filed: Sep. 10, 1979

[51] Int. Cl.³ .............................................. H04N 5/76
[52] U.S. Cl. .................................. 358/128.5; 360/10; 369/95; 369/120
[58] Field of Search ................ 179/100.1 G, 100.3 V, 179/15.55 T, 100.3 B, 100.32; 358/128.5, 127, 132; 360/10, 8, 19; 250/578; 369/111, 95, 112, 100, 122, 102, 120, 97

[56] References Cited

U.S. PATENT DOCUMENTS

| | | | |
|---|---|---|---|
| 3,198,880 | 8/1965 | Toulon | 358/128.5 |
| 3,789,137 | 1/1974 | Newell | 360/8 |
| 3,829,610 | 8/1974 | Meeussen | 360/20 |
| 3,878,560 | 4/1975 | Romage | 360/8 |
| 4,022,986 | 5/1977 | Teer | 179/100.3 V |
| 4,084,185 | 4/1978 | de Langg | 179/100.1 G |
| 4,085,423 | 4/1978 | Tsunoda | 179/100.1 G |

Primary Examiner—Alan Faber
Attorney, Agent, or Firm—Flehr, Hohbach, Test, Albritton & Herbert

[57] ABSTRACT

System, method and record medium for the reproduction of pictures and related audio information on a television receiver or monitor. Video information for discrete frames of the picture is recorded in spaced apart tracks on the record medium, and extended audio information for each frame is recorded in a plurality of individually transcribable tracks between the video tracks. The information is read simultaneously from one of the video tracks and from all of the audio tracks for one frame, and the information from successive ones of the audio tracks is processed sequentially to provide extended sound during repeated reproduction of the picture.

16 Claims, 7 Drawing Figures

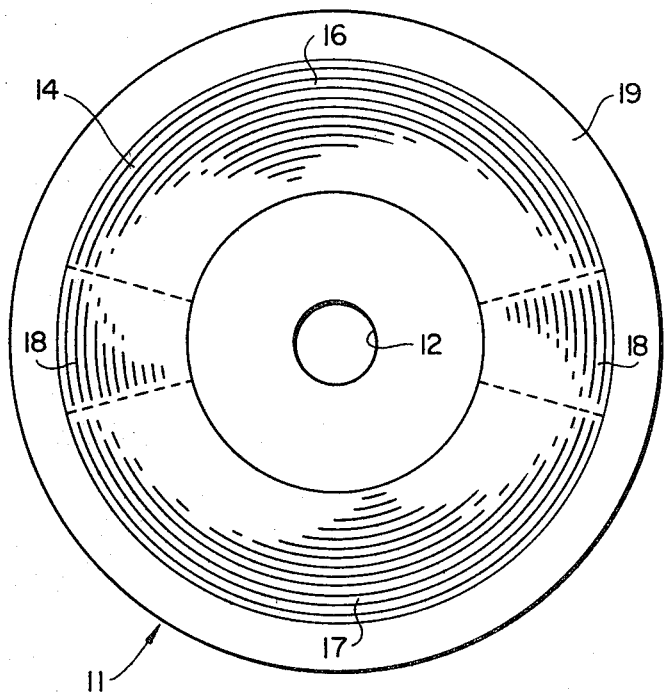
FIG_1
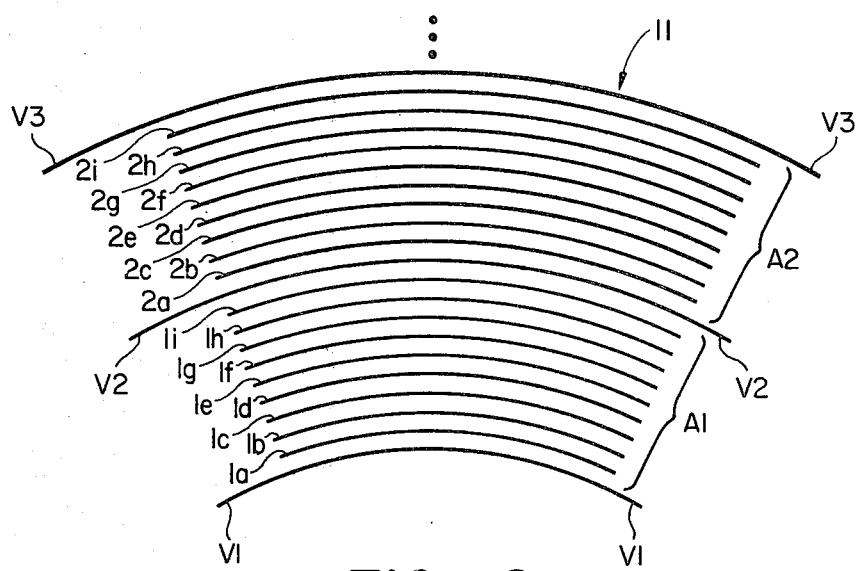
FIG_2

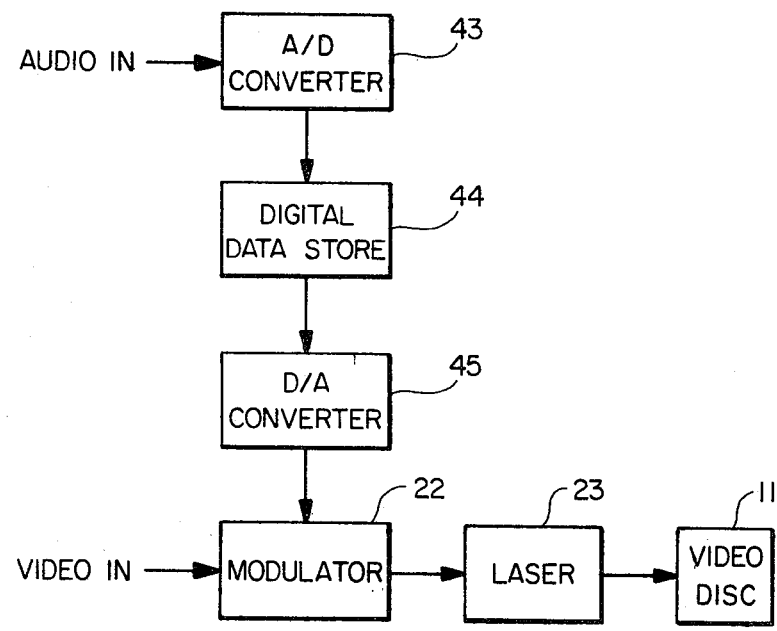
FIG_3
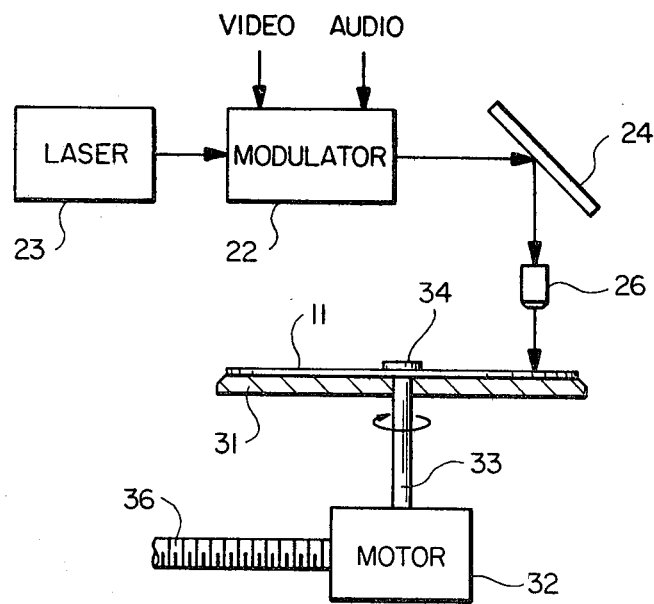
FIG_4

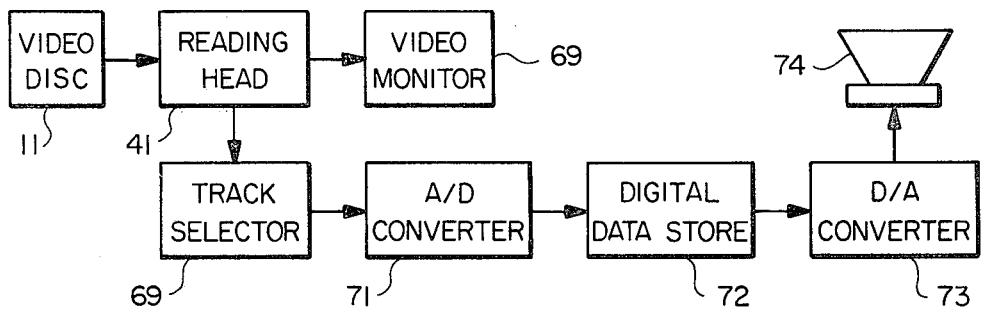
FIG_5
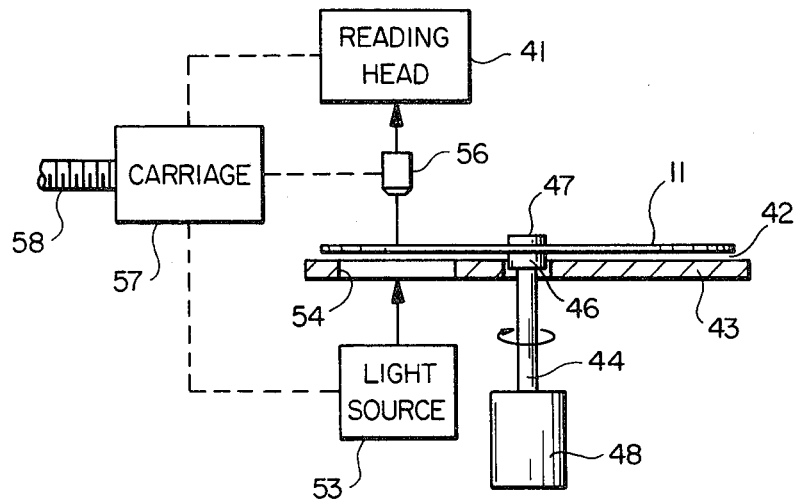
FIG_6
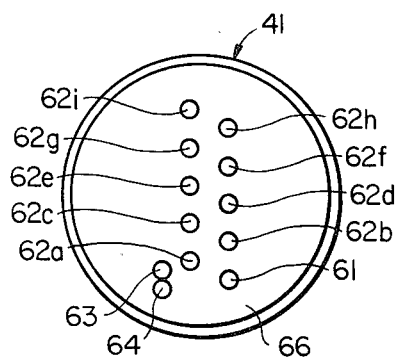
FIG_7

SYSTEM AND METHOD FOR REPRODUCING PICTURES AND RELATED AUDIO INFORMATION

This invention pertains generally to the storage and retrieval of information, and more particularly to a system, method and record medium for the reproduction of pictures and related audio information on a television receiver or video monitor.

In recent years, video discs and other record media such as magnetic tape have found increasing use in the recording and reproduction of television pictures and sound. In such systems, the picture is scanned in discrete frames on a line by line basis, and the video information is recorded sequentially in video tracks on the record medium. The audio information is likewise recorded sequentially, and the recorded information is transcribed to simultaneously reproduce the picture and sound. In such systems, the amount of sound recorded for each frame of the picture corresponds generally to the time required to scan the frame, and the reproduced sound is approximately co-extensive in time with the picture.

There have also been attempts to utilize video discs in the reproduction of television pictures and sound where the sound for each frame is of greater duration than the frame itself, e.g. for the display of still pictures with an extended verbal description or explanation. This type of presentation is particularly useful for educational or training purposes. U.S. Pat. No. 3,829,610, for example, shows a system employing a record disc having several concentric tracks of video information in one region thereof and one or more helical sound grooves in another region, with the sound information for each of the video tracks extending over several convolutions of a sound groove. The video tracks and sound grooves are scanned by separate heads, with the video head repeatedly scanning a single video track while the audio head scans the successive convolutions of the corresponding sound groove. Systems of this type have certain limitations and disadvantages in that separate heads for the sound and picture are relatively expensive, difficult to align, and difficult to maintain.

It is in general an object of the invention to provide a new and improved system, method and record medium for reproducing pictures and related audio information on a television receiver or monitor.

Another object of the invention is to provide a system, method and record medium of the above character in which extended audio information is provided for each frame of the picture.

Another object of the invention is to provide a system, method and record medium of the above character which are particularly useful for educational and training purposes.

Another object of the invention is to provide a system, method and record medium of the above character utilizing a single head for reading both the video information and the audio information recorded on the medium.

Another object of the invention is to provide a system, method and record medium of the above character in which the video and audio information are recorded photographically on the record medium and read optically therefrom.

Another object of the invention is to provide a system, method and record medium of the above character in which the audio information is recorded in a digitized and compressed format on the record medium.

These and other objects are achieved in accordance with the invention by recording video information for discrete frames of a television picture in spaced apart tracks on a record medium, recording extended audio information for each frame in a plurality of individually transcribable tracks between the video tracks, reading the information from one of the video tracks to reproduce one frame of the picture, and reading the information from successive ones of the audio tracks to reproduce the extended audio information. The audio tracks for each frame have a predetermined positional relationship to the video track, and the audio and video tracks are scanned simultaneously by a single reading head. The information is recorded photographically and read optically, and the audio information is recorded in a digitized and compressed format to further extend the amount of audio information for each frame of the picture.

FIG. 1 is a plan view, somewhat schematic, of a record medium having video and audio information recorded thereon in accordance with the invention.

FIG. 2 is an enlarged fragmentary view of the record medium of FIG. 1.

FIG. 3 is a simplified block diagram of one embodiment of a system for recording the information on the record medium of FIG. 1.

FIG. 4 is a schematic illustration of a portion of the recording apparatus in the embodiment of FIG. 3.

FIG. 5 is a simplified block diagram of one embodiment of a playback system for the record medium of FIG. 1.

FIG. 6 is a schematic illustration of a portion of the playback apparatus in the embodiment of FIG. 5.

FIG. 7 is an enlarged plan view of one embodiment of a reading head for use in the embodiment of FIG. 5.

As illustrated in FIGS. 1-2, the invention employs a record medium in the form of a video disc 11 having an axial opening 12 for receiving a drive spindle. The disc has radially spaced circular recording tracks 14 disposed concentrically about the axis of the disc. In one presently preferred embodiment, the disc has 5,000 tracks with a 14 micron center-to-center track spacing, occupying an annular recording band having an inner radius of 8 cm and an outer radius of 15 cm. Each track has a width on the order of ten microns. While the track spacing is illustrated as being uniform across the entire recording band, any desired spacing can be employed, although for reasons discussed more fully hereinafter, the spacing is preferably such that the positional relationship of the tracks is similar for each frame of the picture.

Each of the tracks contains either the video information for one complete frame of a television picture or audio information relating thereto. For a standard NTSC video signal having approximately 30 frames per second, the disc is rotated at a rate of approximately 1800 rpm, and the video information for one frame fills one track. Each frame comprises two interlaced fields, each of which is made up of 262.5 horizontal lines which are scanned and recorded in a sequential fashion. In the embodiment illustrated, the information for the first field of each frame is recorded in a first segment 16 of the track, the information for the second field is recorded in a second segment 17, and the information which occurs during the vertical retrace intervals is recorded in smaller segments 18 between the other sectors. If desired, address coding for the different tracks can also be recorded in segments 18. Although illustrated as being radially aligned, the segments for different tracks can be positioned in any desired manner, even randomly. The audio information for each frame is recorded continuously in the audio tracks for the frame, with the start of the information in each track preferably in radial alignment with the start of the first video segment for the frame.

In order to provide extended audio or sound information, a plurality of audio tracks is provided for each frame of the picture. During playback, the information recorded in these tracks can be produced successively during repeated scanning of the video track to provide a still picture with extended audio or sound. In the embodiment illustrated, nine audio tracks are provided for each video track. With the disc rotating at a speed of 1800 rpm, each track is scanned in 33.33 milliseconds, and the nine audio tracks for each frame have a total scanning time of 300 milliseconds. By recording the audio information in a compressed format, the amount of audio information for each frame of the picture can be extended even further. For example, with a compression of 100:1, the nine audio tracks can provide up to 30 seconds of sound for each frame. A greater or lesser number of audio tracks can be employed, if desired, with a corresponding increase or decrease in the amount of audio information per frame.

Referring now to FIG. 2, the manner in which the video and audio tracks are arranged on the disc is illustrated. The video tracks V1, V2, V3, . . . are spaced radially apart, and the audio tracks 1a–1i, 2a–2i, . . . are arranged in groups A1, A2, . . . between the video tracks. The audio tracks for each frame are immediately adjacent to the video track for that frame, and in the embodiment illustrated, the recording progresses in an outward direction, with the video track V1 for the first frame being nearest the center of the disc, followed by the audio tracks for that frame, then the video track V2 for the next frame, and so on.

In the embodiment illustrated, the tracks are spaced uniformly across the recording band of the disc. With this spacing and the audio tracks for each frame being adjacent to the video track for the frame, the tracks have a uniform positional relationship from frame to frame. This relationship enables the video and audio tracks for any one frame to be scanned simultaneously with a single reading head during playback. Since the relationship is uniform from frame to frame, if the head is aligned with the video track for any frame, then it will automatically be aligned with the remaining tracks for that frame. This is a significant advantage because it eliminates the need for separate heads for the video and audio tracks and thereby avoids the expense and problems of alignment and maintenance associated with separate heads. It should be noted that while a uniform track spacing is employed in the embodiment illustrated, any desired spacing can be employed between the individual tracks. As long as the arrangement is the same for each frame, the tracks will have the desired uniform positional relationship from frame to frame.

In the preferred embodiment, the video disc is fabricated from a circular sheet of film 19 having a photosensitive emulsion on a light transmissive substrate or base, the film being exposed and developed to vary the opacity of the disc in accordance with the video and audio information to be recorded thereon. One suitable disc has a fine-grained silver halide emulsion on the order of 6 microns thick on a 4.5 mil mylar base.

If desired, the record medium can take other forms such as a cylinder having axially spaced recording tracks, and other recording techniques can be employed. However, the photographically prepared video disc is preferred because it is inexpensive and easy to reproduce, it provides a high storage density, and it can be stored easily. In addition, it permits the use of relatively inexpensive playback apparatus.

Referring now to FIGS. 3–4, a preferred system for recording the video and audio information on the disc is illustrated. In this system, both the video information and the audio information are recorded in an analog form on the photographic disc. The video input signal can be obtained from any suitable source such as a television camera, a video tape player, or a kinescope, and this signal is applied to one input of a modulator 22 which controls the intensity of a beam generated by a laser 23. In the preferred embodiment, laser 23 is a HeNe laser having a power output on the order of 5 milliwatts, and modulator 22 is a acousto-optical modulator through which the laser beam passes. As illustrated in FIG. 4, a mirror 24 directs the modulated beam toward an objective lens 26 which focuses the beam on the video disc. The video disc is mounted on a turntable 31 which is driven by a motor 32 and drive shaft 33. The disc is clamped to the turntable by a hub 34 and rotates with the turntable. The turntable and motor are mounted on a carriage (not shown) which is movable in a direction perpendicular to the axis of the disc whereby the beam can be aligned with any desired track on the disc. The carriage is driven by a lead screw 36 and a suitable drive motor and control (not shown).

Referring again to FIG. 3, the audio input is applied to an analog-to-digital converter 43. In the preferred embodiment, the audio signal is sampled at a rate of 10,000 samples per second, with 8 bits per sample providing a resolution of 256 levels.

The output of A/D converter 43 is connected to the data input of a digital data store 44, and the output of the data store is connected to the input of a digital-to-analog converter 45. The output of this converter is connected to a second input of modulator 22. The digitized data is read into the data store in real time and is read out in high speed bursts, whereby the data is compressed. In the preferred embodiment, digital store 44 comprises a buffer into which the audio data is read at a rate of 80,000 bits per second for 3.2768 seconds for each frame of the picture. The data for each frame is read out of the buffer at a rate of 8 million bits per second in a time of 32.768 milliseconds to provide a compression of 100:1.

Operation and use of the system of FIGS. 3–4 and therein the recording method of the invention can now be described. The unexposed video disc is rotated by turntable 31, and the turntable carriage is positioned so that the laser beam is focused on the video track for the first frame to be recorded. As the disc rotates, the intensity of the laser beam varies in accordance with the digitized video information, and the video track is exposed accordingly. When the video track has been recorded, the turntable carriage is moved 14 microns to position the laser beam on the first audio track for the frame. The 3.2768 seconds of audio information for this track is read into the compressor buffer in real time and read out in 32,768 milliseconds. The compressed audio signal is reconverted to analog form and applied to the modulator to vary the intensity of the beam and expose the audio track accordingly. The turntable carriage then moves another 14 microns, and the next audio track is exposed by the laser beam in accordance with the next 3.2768 seconds of audio information. The process continues until the desired number of video and audio tracks have been recorded. The exposed disc is then removed from the drive mechanism and developed.

Referring now to FIGS. 5-7, the playback apparatus includes a single reading head 41 for simultaneously scanning the video and audio recording tracks for one frame of the picture. For playback, video disc 11 is rotatively supported on an air bearing 42 above a stationary table 43. The disc is mounted on a spindle 44 having a radial flange 46 and a hub 47 between which the disc is clamped. The spindle is driven by a drive motor 48.

Light for reading the information stored on the disc is provided by a light source 53 positioned beneath a radial slot 54 in table 43. In one presently preferred embodiment, the light source comprises an incandescent lamp and a condenser, but any suitable light source, including a laser, can be employed. The light passing through the table and disc is modulated in intensity by the information recorded on the disc, and an objective lens 56 projects a magnified image of the tracks to be read onto the reading head. Servomechanisms (not shown) of a well known type provide automatic tracking and focusing to maintain the projected image in proper relationship with the reading head.

Light source 53, lens 56 and reading head 41 are all mounted on a carriage 57, and a lead screw 57 is connected to the carriage for positioning the same to read a desired track on the disc. Reading head 41 includes individual sensing elements 61 and 62a-62i in the form of photodiodes for the video track and the audio tracks, respectively. The vertical spacing between the diodes corresponds to the track spacing in the magnified image which is projected onto the reading head, and alternate ones of the diodes are displaced laterally to permit a closer vertical spacing between the diodes. Additional diodes 63, 64 are positioned immediately above and below the horizontal center line of video sensor 61. These diodes receive unequal amounts of light from the video track when the image is misaligned on the reading head, and a correction signal derived from the outputs of these diodes is applied to a tracking servomechanism to maintain the image in proper alignment on the reading head. The diodes are mounted on a ceramic substate 66, and connections to the diodes are made by conductive traces on the substate and by pins which project from the substate. The traces and pins are of a conventional nature an have been omitted from the drawings for clarity of illustration.

After suitable amplification, the signal from video sensor 61 is applied to a video reproducer 69 such as a television receiver or a video monitor.

The signals from audio sensors 62a-62i are applied to a track selector 69 which delivers the audio information from successive ones of the tracks to an analog-to-digital converter 71, the output of which is connected to the data input of a digital store 72. The data store includes a buffer into which the compressed audio data is read at a rate of 8 million bits per second during the 32.768 millisecond period the information is read from the disc. The data is then read out of the buffer at a rate of 80,000 bits per second for a period of 3.2768 seconds to restore the data to a real time basis.

The decompressed data from data store 72 is reconverted to analog form by a digital-to-analog converter 73, and the analog signal is amplified or otherwise processed for application to a suitable audio reproducer 74.

Operation and use of the playback apparatus of FIGS. 5-7 and therein the playback method of the invention can now be described. The previously recorded video disc 11 is mounted on flange 46 and secured by hub 47. Carriage 57 is positioned to align lens 56 with the tracks for the desired frame. As the disc rotates, the video track and all of the audio tracks for the desired frame are scanned simultaneously by reading head 41. The video information is processed repeatedly during successive revolutions of the disc, and the picture represented by that information is reproduced repeatedly. Track selector 69 passes audio information from successive ones of the audio tracks to the data store during successive revolutions of the disc. Thus, while the video information is reproduced repeatedly, the audio information is reproduced sequentially to provide the extended audio for the picture. When the audio information from all of the tracks for the first frame has been reproduced, the carriage is shifted to bring the light source, lens and reading head into position to read the tracks for another frame. This process continues until the desired number of frames have been reproduced. If less than nine tracks of audio are recorded, the disc is repositioned for the next frame upon completion of the number of tracks which are present. In this case, a control signal can be recorded in the last audio track to condition the apparatus to switch to the next frame.

The invention has a number of important features and advantages. With nine tracks of audio for each track of video and a compression ratio of 100:1, up to 30 seconds of audio can be provided for each frame. With 5,000 tracks utilized in this manner, the playing time of the disc is over four hours. The disc itself can be reproduced readily and economically, it has a high storage density, and it can be played back on relatively inexpensive playback apparatus. All of the video and audio information for a complete frame is read with a single head, and any desired number of audio tracks can be provided for each frame.

It is apparent from the foregoing, that a new and improved system, method and record medium for reproducing pictures and related audio information have been provided. While only certain presently preferred embodiments have been described, as will be apparent to those familiar with the art, certain changes and modifications can be made without departing from the scope of the invention as defined by the following claims.

What is claimed is:

1. In a method for the storage and retrieval of video and audio information, the steps of: recording video information for discrete frames of a television picture in spaced apart tracks on a record medium, recording extended audio information for each frame in a plurality of individually transcribable tracks between the video tracks, the audio tracks for each frame being spaced from each other and from the video track for the frame in a predetermined pattern which is similar for all of the frames, simultaneously reading the information from the video track and all of the audio tracks for one frame of the picture with a single sensing head having a plurality of sensing elements arranged in accordance with the predetermined pattern for simultaneously scanning the respective tracks for the frame, and sequentially processing the information from successive ones of the audio tracks to reproduce the extended audio information during reproduction of the picture.

2. The method of claim 1 wherein the audio information is recorded in a compressed format.

3. The method of claim 1 wherein the information is recorded photographically on the record medium.

4. The method of claim 1 wherein up to nine tracks of audio information are recorded for each track of video information.

5. In a system for the storage and retrieval of video and audio information: a record medium, recording apparatus including means for recording video information for discrete frames of a television picture in spaced apart tracks on the record medium and recording extended audio information for each frame in a plurality of individually transcribable tracks between the video tracks, the audio tracks for each frame being spaced from each other and from the video track for the frame in a predetermined pattern which is similar for all of the frames, and playback apparatus including means for reading the information from one of the video tracks to reproduce one frame of the picture, and means for reading the information from the audio tracks for the one frame and sequentially processing the information from successive ones of the audio tracks to reproduce the extended audio information during reproduction of the picture, said playback apparatus including a single reading head having a plurality of sensing elements arranged in accordance with the predetermined pattern for simultaneously reading the information from the video track and all of the audio tracks for the one frame.

6. The system of claim 5 wherein the record medium comprises a video disc.

7. The system of claim 5 wherein the record medium comprises a photosensitive medium, and the recording apparatus includes a laser for exposure of the photosensitive medium in accordance with the video and audio information to be recorded.

8. The system of claim 5 wherein the recording apparatus includes means for compressing the audio information for recording on the disc, and the playback apparatus includes means for decompressing the audio information read from the disc.

9. The system of claim 5 wherein the playback apparatus includes switching means for selecting the audio information from successive ones of the audio tracks to reproduce the extended audio information during continuous reproduction of the picture for the frame.

10. The system of claim 5 wherein up to nine tracks of audio information are recorded for each track of video information.

11. In a method for the reproduction of a television picture and sound utilizing a record medium having video information for discrete frames of the picture recorded in spaced apart circular tracks thereon and extended audio information for each of the frames recorded in a plurality of individually transcribable tracks between the video tracks, the audio tracks for each frame being spaced from each other and from the video track for the frame in a predetermined pattern, the steps of: scanning the video track and all of the audio tracks for one frame simultaneously with a single recording head having a plurality of sensing elements arranged in accordance with the predetermined pattern for scanning the respective tracks, processing the information from the video track to repeatedly reproduce the picture corresponding thereto, and processing the information from successive ones of the audio tracks to provided extended sound for the picture.

12. The method of claim 11 wherein the tracks for the one frame are scanned repeatedly during successive revolutions of the record medium, and the audio information from successive ones of the tracks is processed during successive revolutions of the record medium to provide the extended sound for the picture.

13. The method of claim 11 wherein the video and audio information is recorded photographically on a light transmissive medium and is read by sensing light passing through the tracks in which the information is recorded.

14. In playback apparatus for a record medium having video information for discrete frames of a television picture recorded in spaced apart tracks and extended audio information for each of the frames recorded in a plurality of individually transcribable tracks between the video tracks for successive frames, the audio tracks for each frame being spaced from each other and from the video track for the frame in a predetermined pattern: a single reading head having a plurality of sensing elements arranged in accordance with the predetermined pattern for simultaneously reading the information from the video track and all of the audio tracks for one of the frames, means for processing the information from the video track to repeatedly reproduce the picture corresponding thereto, and means for processing the information from successive ones of the audio tracks to provide extended sound during the repeated reproduction of the picture.

15. The apparatus of claim 14 wherein the reading head includes means for passing signals from the sensing elements for successive ones of the audio tracks to the processing means.

16. The apparatus of claim 15 wherein the record medium comprises a light transmissive member on which the video and audio information is photographically recorded, the means for reading the information from the video and audio tracks includes a light source, and the sensing elements are responsive to light passing through the video and audio tracks from the light source.

* * * * *